(12) United States Patent
Hanlon et al.

(10) Patent No.: US 8,056,793 B2
(45) Date of Patent: Nov. 15, 2011

(54) APPARATUS AND METHOD FOR FRICTION SURFACING USING A CONSUMABLE PIN TOOL

(75) Inventors: Timothy Hanlon, Glenmont, NY (US); Jason Bernard Fritz, Norwood, OH (US); Jeffrey Jason Bernath, Columbus, OH (US); Alexander Banning Channell, Powell, OH (US); Jonathan Paul Blank, Mason, OH (US); Sergey Eduardovich Kalabekov, Moscow (RU); Jonathan Robert Hootman, Lawrenceburg, IN (US); Timothy Joseph Trapp, Wyoming, OH (US)

(73) Assignee: General Electric Company, Niskayuna, NY (US)

( * ) Notice: Subject to any disclaimer, the term of this patent is extended or adjusted under 35 U.S.C. 154(b) by 100 days.

(21) Appl. No.: 12/336,489

(22) Filed: Dec. 16, 2008

(65) Prior Publication Data

US 2010/0147925 A1 Jun. 17, 2010

(51) Int. Cl.
*B23K 20/12* (2006.01)
(52) U.S. Cl. ..................................... 228/2.1; 228/112.1
(58) Field of Classification Search ............... 228/112.1, 228/2.1
See application file for complete search history.

(56) References Cited

U.S. PATENT DOCUMENTS

| 5,697,544 | A | * | 12/1997 | Wykes ........................... 228/2.1 |
| 5,718,366 | A | * | 2/1998 | Colligan ..................... 228/112.1 |
| 6,237,835 | B1 | * | 5/2001 | Litwinski et al. .......... 228/112.1 |
| 6,669,075 | B2 | * | 12/2003 | Colligan ........................ 228/2.3 |
| 6,811,632 | B2 | | 11/2004 | Nelson et al. |
| 7,121,448 | B2 | | 10/2006 | Subramanian et al. |
| 7,152,776 | B2 | | 12/2006 | Nelson et al. |
| 7,270,257 | B2 | | 9/2007 | Steel et al. |
| 7,416,102 | B1 | * | 8/2008 | Trapp et al. .................... 228/2.1 |
| 2005/0045695 | A1 | * | 3/2005 | Subramanian et al. .... 228/112.1 |
| 2006/0163328 | A1 | | 7/2006 | Subramanian et al. |
| 2006/0175382 | A1 | | 8/2006 | Packer et al. |

\* cited by examiner

*Primary Examiner* — Roy King
*Assistant Examiner* — Michael Aboagye
(74) *Attorney, Agent, or Firm* — Penny A. Clarke

(57) ABSTRACT

A friction surfacing apparatus and method for depositing one or more metals, metal alloys, or other materials is disclosed. The friction surfacing apparatus includes a pin tool holder, a non-consumable shoulder having an inside diameter and an outside diameter, the inside diameter terminating at an end wall and includes an angled side wall that forms a substantially frustoconical opening at one end, and a consumable pin tool coupled to the pin tool holder and at least partially protruding from the end wall of the shoulder. The shoulder is maintained at a predetermined distance from a surface of a workpiece such that the consumable pin tool deposits pin tool material onto the surface of the workpiece during a friction surfacing operation.

9 Claims, 3 Drawing Sheets

APPARATUS AND METHOD FOR FRICTION SURFACING USING A CONSUMABLE PIN TOOL

BACKGROUND OF THE INVENTION

The invention relates generally to an apparatus and a method for friction surfacing, and in particular to an apparatus and a method for friction surfacing using a consumable pin tool.

Friction stir welding is a solid-state joining technique that is well known to those of ordinary skill in the art. Typically, friction stir welding is used to join difficult-to-weld metals, metal alloys (such as aluminum alloys, titanium alloys, nickel alloys, and the like), and other materials. For example, certain aluminum alloys are sensitive in a plasticized heat-affected zone, where the base metal reaches temperatures between solidus and liquidus during welding. In this zone, partial melting at grain boundaries forms a network containing brittle compounds. As a result, weld ductility is substantially reduced.

Friction stir welding is not to be confused with friction surfacing. In friction stir welding, a pin tool is plunged into a rigidly clamped workpiece and traversed along the joint to be welded. As the pin tool is traversed along the joint to be welded, the two materials are joined by way of frictional heating and plasticizing the workpiece with a pin tool, and mechanical mixing (stirring) material from the leading edge of the pin tool to the trailing edge of the pin tool.

By contrast, in friction surfacing, frictional heating plasticizes a consumable pin tool, which is forged onto the substrate surface. In friction surfacing, there is no mechanical mixing (stirring) between the workpiece material and the deposit material.

BRIEF DESCRIPTION OF THE INVENTION

In general, the invention is directed to a friction surfacing apparatus and method in which a consumable pin tool is manufactured of a desired material, typically the same as the workpiece, but it can be different. The pin tool is mounted in an apparatus that lowers and rotates the consumable pin tool as it traverses the workpiece surface. The rotating pin tool traverses the workpiece (typically not at a joint) and deposits a thin layer of the consumable pin tool material through the frictional and thermo-mechanical work produced by the process. As a result, the process occurs below the melting point of the consumable pin tool material and the workpiece, thereby creating a solid-state friction surfacing deposition process.

In one aspect, a friction surfacing apparatus for depositing one or more metals, metal alloys, or other materials comprises a pin tool holder; a non-consumable shoulder having an inside diameter and an outside diameter, the inside diameter terminating at an end wall and includes an angled side wall that forms a substantially frustoconical opening; and a consumable pin tool coupled to the pin tool holder, the pin tool at least partially disposed within the shoulder and at least partially protruding from the end wall of the shoulder. The shoulder is maintained at a predetermined distance from a surface of a workpiece such that the consumable pin tool deposits pin tool material onto the surface of the workpiece during a friction surfacing operation.

In another aspect, a method for friction surfacing one or more metals, metal alloys, or other materials using a friction surfacing apparatus comprising a pin tool holder; a non-consumable shoulder having an inside diameter and an outside diameter, the inside diameter terminating at an end wall and includes an angled side wall that forms a substantially frustoconical opening; and a consumable pin tool coupled to the pin tool holder, the pin tool at least partially disposed within the shoulder and at least partially protruding from the end wall of the shoulder, the method comprising:

rotating the consumable pin tool relative to a workpiece while the consumable pin tool engages the workpiece; and maintaining the shoulder at a predetermined distance from the workpiece while traversing the consumable pin tool across the workpiece, whereby rotation of the consumable pin tool, in conjunction with a forging load imposed between the pin tool and the workpiece, provides a combination of frictional heat and thermo-mechanical working to frictionally heat the consumable pin tool to a temperature below its melting point and deposits pin tool material onto the surface of the workpiece.

DETAILED DESCRIPTION OF THE INVENTION

Figure 1:
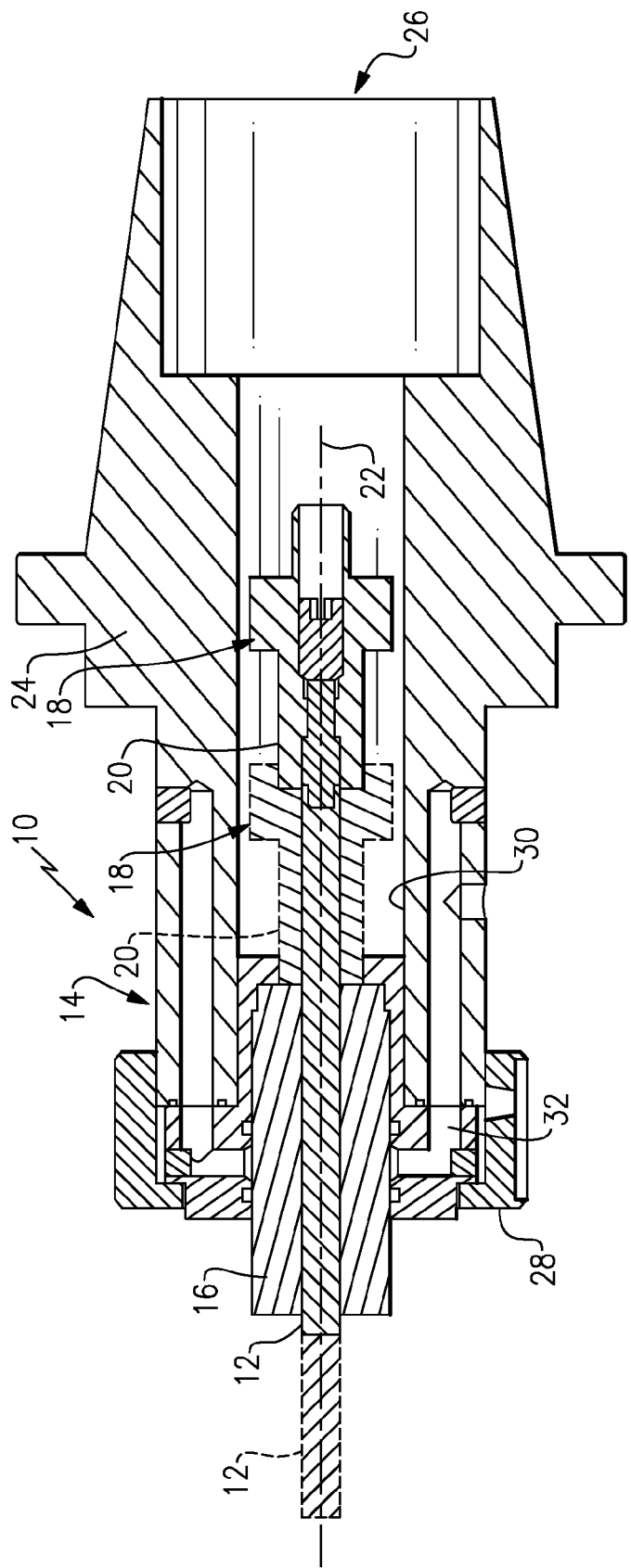
FIG. 1 is a cross-sectional side view of a friction surfacing apparatus with a consumable pin tool according to an embodiment of the invention.
Figure 2:
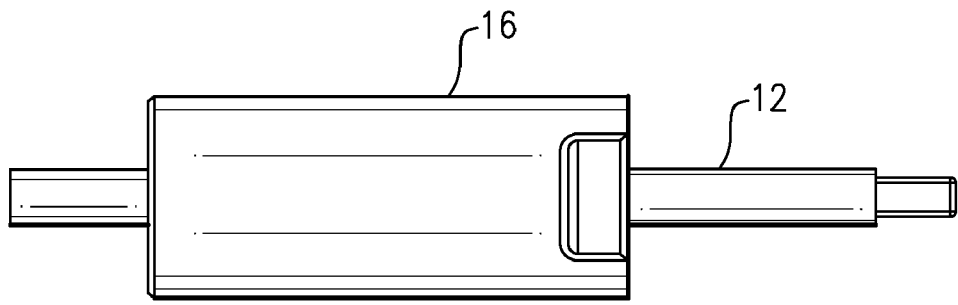
FIG. 2 is a side view of a portion of the consumable pin tool according to an embodiment of the invention.

Referring to FIGS. 1 and 2, a friction surfacing apparatus 10 that includes a consumable pin tool 12 selectively disposed within a pin tool holder 14 is shown according to an embodiment of the invention. The pin tool 12 is selectively and continuously movable between a first, retracted position (shown in solid in FIG. 1) and a second, extended position (shown in phantom in FIG. 1). In the second, extended position, the pin tool 12 at least partially protrudes beyond the surface of a shoulder 16 associated with the pin tool 12 and the pin tool holder 14. In the illustrated embodiment, the pin tool 12 has a substantially cylindrical, rod-like, or conical shape. For example, the pin tool 12 may have a substantially pointed shape with a taper of about 45 degrees. The pin tool 12 may also be partially or wholly hollow. In one embodiment, the pin tool 12 has a diameter of about 0.33 inches (8.38 mm). However, the pin tool 12 can have a diameter in a range between about 0.02 inches (0.51 mm) to about 2.00 inches (50.8 mm), depending on the application.

Figure 3:
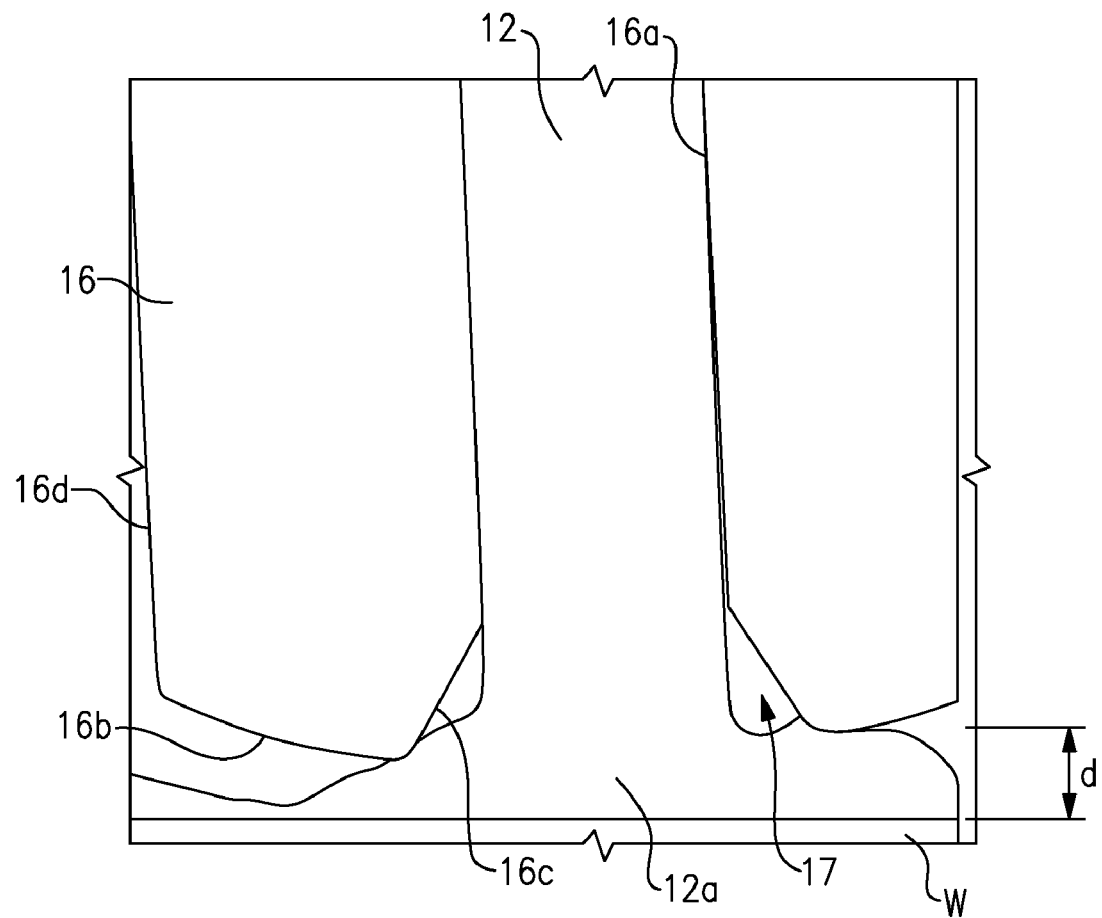
FIG. 3 is an enlarged cross-sectional view of the consumable pin tool and the shoulder showing pin tool material being deposited during a friction surfacing operation.

The pin tool 12 is coupled to a drive mechanism 18, such as a spindle, and the like, by a stem piece 20. In the illustrated embodiment, the stem piece 20 has a substantially cylindrical shape, although other suitable shapes may be used. The drive mechanism 18 is operable for rotating the pin tool 12 and, optionally, the shoulder 16 about an axis 22 of the pin tool 12, the shoulder 16, and the pin tool holder 14. In an alternative embodiment, a second drive mechanism (not shown) can be used to rotate the shoulder 16 independent from the pin tool 12. Typically, the pin tool 12 is rotated at a speed of between about 100 rpm and about 100,000 rpm during the friction surfacing process. It should be noted that the amount of material deposited by the pin tool 12 is dependent upon the rotational speed of the pin tool 12, the feed rate of the pin tool 12 through the shoulder 16, the traverse speed of the friction surfacing apparatus 10, the distance between the tip of the shoulder 16 and the surface of the workpiece W. The pin tool 12 is made of a material that is the same as, similar to, or dissimilar from the workpiece W (FIG. 3). For example, if the workpiece is made of a metal or metal alloy, the pin tool 12 may be made of that same metal or metal alloy, another similar metal or metal alloy, or any other dissimilar material that provides a desired characteristic when the pin tool material is deposited on the workpiece W.

Referring now to FIG. 3, the shoulder 16 comprises an annular structure through which the pin tool 12 is fed. Preferably, the shoulder 16 has a substantially cylindrical shape, although other suitable shapes may be used. The shoulder 16 has an inside diameter 16a that is slightly larger than the outer diameter of the pin tool 12 in order to accommodate the pin tool 12 without restriction and/or binding. The shoulder 16 has an outside diameter 16d that is substantially parallel to the inside diameter 16 and is about two to three times larger than the diameter of the pin tool 12, although any suitable dimensions may be used. For example, the shoulder 16 can have an outside diameter 16d in a range between about 0.20 inches to about 4.00 inches. The shoulder geometry can be tailored to minimize the flash associated with the friction surfacing process, and can also be used to shape the deposit. In the illustrated embodiment, the shoulder 16 terminates at an end wall 16b. The end wall 16b is maintained at fixed offset displacement or distance, d, from the surface of the workpiece W. The distance, d, determines the thickness and the shape of the consumable pin material 12a that is applied to the surface of the workpiece W during the friction surfacing operation. The inside diameter 16a includes an angled sidewall 16c that extends radially inward from the end wall to form a substantially frustoconical opening 17 through which substantially plastic consumable pin material 12a is applied to the surface of the substrate or workpiece W. The angled sidewall 16b minimizes the radial and hoop stresses generated in the shoulder 16, as well as the tendency for binding of the consumable pin tool 12 to the shoulder 16. In other words, the angled sidewall 16c of the shoulder 16 provides a convex profile to minimize consumable pin material 12a buildup within the inner diameter of shoulder 16.

Referring back to FIGS. 1 and 2, the non-consumable shoulder 16 protrudes from the pin tool holder 14 by about 0.50 inches, although any suitable dimensions may be used. The portion of the shoulder 16 in direct contact with the deposit can be convex, concave or flat, and may contain features such as concentric or spiral grooves. For high temperature/high strength material deposition, the shoulder 16 is non-consumable and is made of a refractory alloy (such as a molybdenum-based alloy, a tungsten-based alloy, and the like). Alternatively, the shoulder 16 is consumable and is made of a material that is the same as, similar to, or dissimilar from the workpiece. The shoulder 16 may also be selectively and continuously retracted into/extended from the pin tool holder 14, in conjunction with or independent of the retraction/extension of the pin tool 12.

The pin tool holder 14 also comprises an annular structure through which the pin tool 12 is fed at a desired feed rate while the rotating pin tool 12 traverses along the workpiece. In one embodiment, the feed rate ranges from about 0.1 to about 3.0 inches/minute (2.54 mm/minute to about 76.2 mm/minute). It should be noted that the feed rate of the pin tool 12 varies based upon pin tool material and the material(s) of the workpiece. The pin tool holder 14 includes at least one spindle 24 and a plurality of end sections 26, 28 configured to retain and guide the pin tool 12, the drive mechanism 18, the stem piece 20, and optionally the shoulder 16 (indicated by dashed lines in FIG. 1). In the illustrated embodiment, the spindle 24 has a substantially cylindrical shape, although other suitable shapes may be used. The spindle 24 has an inside diameter that is slightly larger than the diameter of the pin tool 12 and the drive mechanism 18 in order to prevent interference and/or galling. The length of the spindle 24 is as short as possible in order to prevent spindle run-out, which may affect positional accuracy, as well as weld quality/soundness. However, the length of the spindle 24 is long enough to allow a sufficient length of feedstock (i.e., the pin tool 12) to be provided in order to produce a weld of useful continuous length. In one embodiment, the spindle 24 is made of tool steel or the like.

In another embodiment, the non-consumable shoulder 16 may be rotated by a second spindle (not shown) about the axis 22 of the consumable pin tool 12, the shoulder 16, and the pin tool holder 14 in the same direction or in an opposite direction as the pin tool 12, and at similar or dissimilar rotational speed than the pin tool 12. For example, the pin tool 12 may rotate at a speed of about 1000 rpm, while the shoulder 16 remains stationary. In another example, the pin tool 12 may rotate at a speed of about 5000 rpm in one direction, while the shoulder rotates at a speed of about 1000 rpm in the opposite direction. In another example, the pin tool 12 may rotate at a speed of about 1000 rpm in one direction, while the shoulder rotates at a speed of about 1000 rpm in the same direction. Thus, the non-consumable shoulder 16 may be stationary, rotate with (or counter to) the consumable pin tool 12, at the same or at a different rotational speed because the pin tool 12 and the shoulder 16 are mounted on different spindles.

The inside surface 30 of the spindle and the drive mechanism 18 and stem piece 20 define one or more channels through which a cooling fluid flows. The cooling fluid is operable for cooling the pin tool 12 and/or the shoulder 16 and includes air, water, cooling oil, or any other suitable cooling fluid. In the case of a consumable pin tool 12, the temperature of the tip of the pin tool 12 is maintained in a range in which the pin tool material is substantially plastic. For example, the temperature of the tip of the pin tool 12 is maintained in a range of between about 1,650° F. (900° C.) and about 1,990° F. (1088° C.) for titanium alloys and about 1,800° F. (982° C.) and about 2,200° F. (1204° C.) for steel and nickel alloys. Likewise, if a consumable shoulder 16 is used, the temperature of the shoulder 16 is maintained in a range in which the shoulder material is substantially plastic. For example, the temperature of the shoulder 16 is maintained in a range of between about 1,650° F. (900° C.) and about 1,990° F. (1088° C.) for titanium alloys and about 1,800° F. (982° C.) and about 2,200° F. (1204° C.) for steel and nickel alloys. The cooling fluid is introduced into one or more channels depending on design via an exterior-mounted shoulder holder cooling device inlet and outlet (not shown) and a co-axial pin tool inlet 32 disposed in the spindle 24. In order to contain the cooling fluid within the one or more channels in the presence of rotating components, one or more seals 34, such as O-ring seals, and the like, are used. Other suitable cooling mechanisms well known to those of ordinary skill in the art may also be used.

In general, the process of the invention involves engaging the rotating, traversing consumable pin tool 12 across a rigidly clamped workpiece W of similar of dissimilar material composition. Rotation of the pin tool 12, in conjunction with a forging load imposed between the pin tool 12 and the workpiece W, provides a combination of frictional heat and thermo-mechanical work, which frictionally heats the pin tool 12 to a temperature below its melting point and deposits pin tool material 12a onto the surface of the workpiece W. As the pin tool 12 is traversed along the workpiece W, the plasticized metal, metal alloy, or other material 12a is transferred from the leading edge of the pin tool 12 to the trailing edge of the pin tool 12, forming a deposit of the material on the surface of the workpiece in the wake of the pin tool 12. The pin tool 12 is substantially continuously fed along the surface of the workpiece W such that the pin tool material is incorporated onto the surface of the workpiece W. Preferably, the pin tool 12 is traversed along the surface of the workpiece W at a rate that is sufficient to deposit a desired amount of material on the surface of the workpiece W. For example, the pin tool 12 may traverse along the surface of the workpiece W at a rate in a range of between about 0.1 inches/minute (2.54 mm/minute) to about 15.0 inches/minute (381.0 mm/minute).

Figure 4:
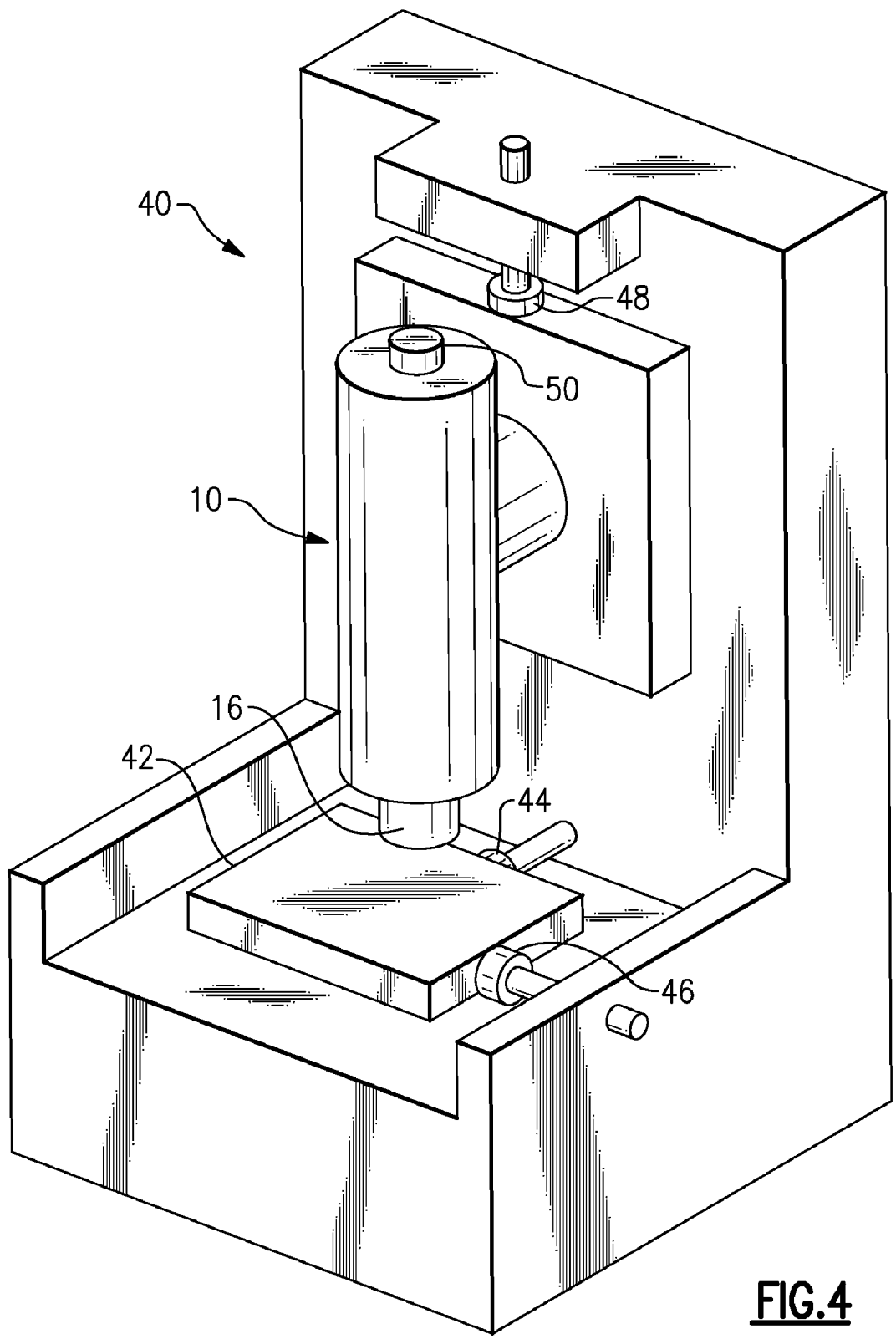
FIG. 4 is a perspective view of a device for axial load feedback control for the pin tool and the shoulder according to an embodiment of the invention.

Referring now to FIG. 4, independent axial load feedback control is used for both the pin tool 12 and the shoulder 16 such that the consumable pin tool 12 is fed through the shoulder 16 under a fixed pin tool axial and/or transverse load control while maintaining a fixed offset displacement, d, between the shoulder 16 and the workpiece W. To accomplish this, the friction surfacing apparatus 10 is mounted on an axial load feedback control device 40 such that the apparatus 10 is movable in a z-axis direction. The device 40 includes a platform 42 on which the workpiece W rests that is movable in both the x-axis and y-axis directions. The device 40 includes an x-axis load cell 44, a y-axis load cell 46 and a z-axis load cell 48 that measures the force exerted by the device 40 in the x-, y- and z-axes. The device 40 also includes a pin tool load cell 50 that measures the force exerted on the rotating pin tool 12. As is known in the art, the signals from the load cells can be processed by a central processing unit (CPU) (not shown) to provide axial load feedback control for both the pin tool 12 (not seen in FIG. 4) and the shoulder 16. For example, the signal from the z-axis load cell can provide a total resultant force in the z-axis of the device 40, including the force on the pin tool load cell 50. The difference between the total resultant force in the z-axis and the force exerted on the pin tool 12 is the resultant force exerted on the shoulder 16. The pin tool load control is desirable to control the feed rate of the pin tool 12 and the shoulder load control is desirable to prevent the friction surfacing apparatus 10 from embedding in the workpiece W.

In the friction surfacing process, the shoulder 16 serves to provide a continuous forging action, improving the mechanical bond between deposited pin tool material 12a and workpiece W, refining the microstructure of deposited pin tool material 12a, and minimizing flash during operation. The forging action can be controlled by using several different scenarios in which separate spindles driving the pin tool 12 and the shoulder 16 may be independently controlled in either displacement control or load control. For example, the pin tool 12 and shoulder 16 can be both displacement controlled. In another example, the pin tool 12 and shoulder 16 can be both load controlled. In yet another example, the pin tool 12 is displacement controlled and the shoulder 16 is load controlled. In yet another example, the pin tool 12 is load controlled and the shoulder 16 is displacement controlled, which represents a preferred embodiment for uniformity in weld thickness.

If a consumable shoulder 16 is used, the shoulder material is incorporated into the pin tool material or, alternatively, disposed on the surface of the pin tool material or workpiece in a layer. When brought into contact with the deposited pin material in-situ, the shoulder 16 can also provide an additional forging load, further encouraging mechanical bonding between the deposit and the substrate. The aforementioned forging action also acts to refine the microstructure in the deposited material, often considered advantageous for surfacing applications.

Tests of the friction surfacing apparatus 10 of the invention have demonstrated unexpected results that the shoulder 16 of the invention distributes the deposited material 12a evenly onto the surface of the workpiece W. Further, the shoulder 16 provides an additional source of in-situ frictional heating. The distance, d, between the surface of the workpiece W and the end wall 16c of the shoulder 16 determines the extent of shoulder interaction with the deposited material 12a. In addition, the combination of pin rotational speed, pin feed rate, tool traverse speed, and shoulder standoff determines the in-situ level of forging experienced by the deposited material. Optimization of these parameters is required for improved mechanical bonding and resultant microstructure of the deposited material.

In addition, because the material deposited by the friction surfacing apparatus 10 represents a fine hot worked microstructure, the deposited material often demonstrates an improved microstructure for surface applications. The localized plastic deformation provided by the pin tool 12 and the shoulder 16 leads to a microstructure characterized by relatively small grains and low porosity. The friction surfacing apparatus 10 of the invention provides the ability to increase the thickness of the material at a single location by performing multiple passes of the friction surfacing apparatus. Sequential passes can be composed of similar or dissimilar materials to build a monolithic or graded structure. Linear, angular and/or contoured deposits can be formed, as required.

As described above, the friction surfacing apparatus and method of the invention can deposit similar or dissimilar material on a wide variety of workpiece or substrate materials, such as nickel based superalloys, titanium alloys, iron based alloys (including iron based superalloys), nickel powder metal alloys, titanium powder alloys, and the like. The friction surfacing apparatus and method can deposit one or more of the above-mentioned materials in applications that include, but is not limited to, 1) friction surfacing of similar or dissimilar material alloys 2) friction surfacing of similar or dissimilar material alloys on component for turbo-machinery applications, such as gas turbine, steam turbine and aircraft engines; 3) repair method of component for turbo-machinery applications, such as gas turbine, steam turbine and aircraft engines; 4) material build-up method, such as dimensional build-up for turbo-machinery applications, such as gas turbine, steam turbine and aircraft engines; 5) seal teeth production method on component for turbo-machinery applications, such as gas turbine, steam turbine and aircraft engines; 6) coating production method on component for turbo-machinery applications, such as gas turbine, steam turbine and aircraft engines; and 7) blades, nozzles and steam turbine buckets, specifically the airfoil, platform and dovetail areas, production method for component turbo-machinery applications, such as gas turbine, steam turbine and aircraft engines.

The friction surfacing apparatus and method of the invention described above has several benefits including: 1) no solidification cracking, porosity, or segregation; 2) a fine, hot-worked metallurgical structure; 3) mechanical properties of the deposited or bonded zone material that are equivalent to or better than the workpiece or base material; 4) lower heat input to the workpiece or base material that helps reduce residual stresses and distortion and leaves the structure and properties of the workpiece or base material in the same or better condition prior to the friction surfacing process; and 5)

ability to tailor the local chemistry, metallurgical structure, and mechanical properties of specific areas or coating of the components.

While the invention has been described in terms of various specific embodiments, those skilled in the art will recognize that the invention can be practiced with modification within the spirit and scope of the claims.

What is claimed is:

1. A friction surfacing apparatus for depositing one or more metals, metal alloys, or other materials, the friction surfacing apparatus comprising:
    a pin tool holder;
    a non-consumable shoulder having an inside diameter, an outside diameter and terminates at an end wall, the inside diameter includes an angled side wall that extends radially inward from the end wall to form a substantially frustoconical opening at one end; and
    a consumable pin tool coupled to the pin tool holder, the pin tool at least partially protruding from the end wall of the shoulder,
    wherein the end wall of the shoulder is maintained at a predetermined distance from a surface of a workpiece such that the shoulder forges a layer of consumable pin tool material onto the surface of the workpiece during a friction surfacing operation, thereby creating a mechanical and chemical bond between the consumable pin tool material and the surface of the workpiece.

2. The friction surfacing apparatus according to claim 1, wherein the consumable pin tool rotates at a speed in a range between about 100 rpm to about 100,000 rpm.

3. The friction surfacing apparatus according to claim 1, wherein the consumable pin tool has a diameter in a range between about 0.02 inches (0.51 mm) to about 2.00 inches (50.8 mm)

4. The friction surfacing apparatus according to claim 1, wherein the consumable pin tool is fed through the shoulder at a feed rate ranging from about 0.1 inches/minute (2.54 mm/minute) to about 3.0 inches/minute (76.2 mm/minute) during the friction surfacing operation.

5. The friction surfacing apparatus according to claim 1, wherein the consumable pin tool is fed through the shoulder under a fixed pin tool axial and/or transverse load control while maintaining a fixed offset displacement between the shoulder and the workpiece.

6. The friction surfacing apparatus according to claim 1, wherein the consumable pin tool is traversed along the surface of the workpiece at a rate in a range of between about 0.1 inches/minute (2.54 mm/minute) to about 15.0 inches/minute (381.0 mm/minute) during operation.

7. The friction surfacing apparatus according to claim 1, wherein the consumable pin tool is maintained at a temperature in a range of between about 1,650° F. (982° C.) and about 2,200° F. (1204° C.) during the friction surfacing operation.

8. The friction surfacing apparatus according to claim 1, wherein the shoulder has a diameter in a range between about 0.20 inches (5.08 mm) to about 4.00 inches (101.6 mm).

9. The friction surface apparatus according to claim 1, wherein the frustoconical opening of the shoulder minimizes radial and hoop stresses generated in the shoulder during the friction surfacing operation.

* * * * *